Nov. 14, 1950  C. E. POWERS  2,529,739
TIRE MAKING MACHINE
Filed May 13, 1949  3 Sheets-Sheet 1

Inventor
Conious E. Powers,
By John C. Brady
Attorney

Nov. 14, 1950     C. E. POWERS     2,529,739
TIRE MAKING MACHINE

Filed May 13, 1949     3 Sheets-Sheet 2

Inventor
Conious E. Powers,
By John B. Brady
Attorney

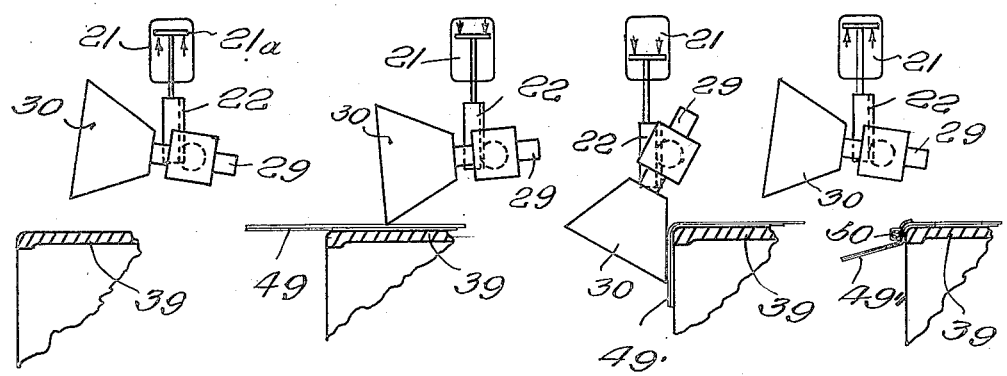
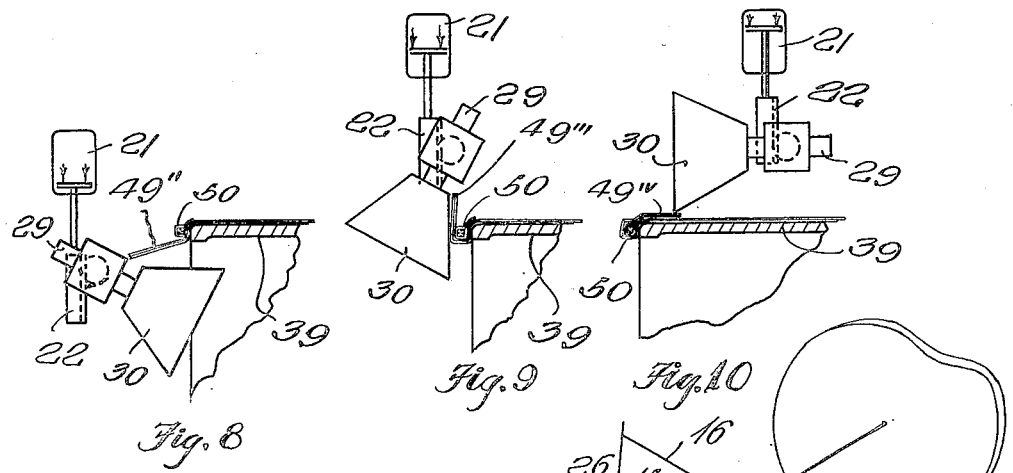
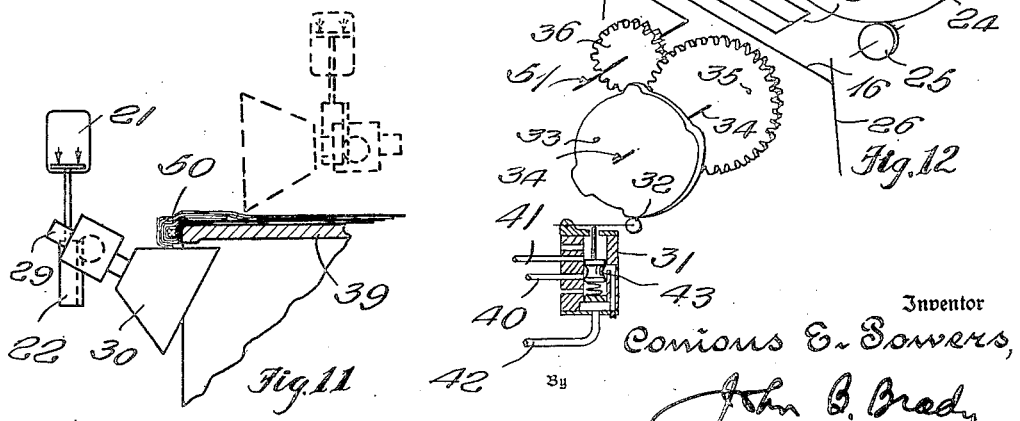

Patented Nov. 14, 1950

2,529,739

UNITED STATES PATENT OFFICE 2,529,739

TIRE MAKING MACHINE

Conious E. Powers, Natchez, Miss.

Application May 13, 1949, Serial No. 93,083

4 Claims. (Cl. 154—9)

My invention relates broadly to tire making machines, and more particularly to an improved construction of tire making machine for manufacturing relatively lightweight tires generally intended for passenger car service.

This application is a continuation in part of my application Serial Number 613,595, filed August 30, 1945, now Patent 2,472,123, dated June 7, 1949, for tire making machines.

One of the objects of my invention is to provide a relatively lightweight construction of tire making machine for producing at a rapid rate vehicle tires of relatively light weight intended particularly for passenger car service.

Another object of my invention is to provide an improved construction of manipulating mechanism for tire making machines which may be attached to certain tire making machines now in use.

Another object of my invention is to provide an arrangement of a program control mechanism for a tire making machine in which the sequence of operations may be automatically controlled for moving the manipulators in properly timed relation to the other operations carried on by the machine for eliminating manual attention to the machine operation to the maximum possible extent.

Another object of my invention is to provide a construction of a rock shaft tire making machine including compressed air controlled mechanism for governing the operation of rock shafts in a tire making machine and manipulating the folding of the fabric of the tire over the end beads in properly timed relation.

Still another object of my invention is to provide an improved construction of rock shaft manipulators for a tire making machine with automatic means for controlling the orbit of movement of the band rollers for operation adjacent the fabric of the tire during the imbedding of the beads in the tire fabric.

Still another object of my invention is to provide a novel construction of a tilting cam arrangement controlled by a crankshaft system for manipulating band rollers with respect to the multiple layer fabric of a tire casing carried by a rotatable tire drum with respect to which the band rollers are moved in an orbit in timed relation both interiorly and exteriorly of the ends of the rotating tire drum.

Figure 1:
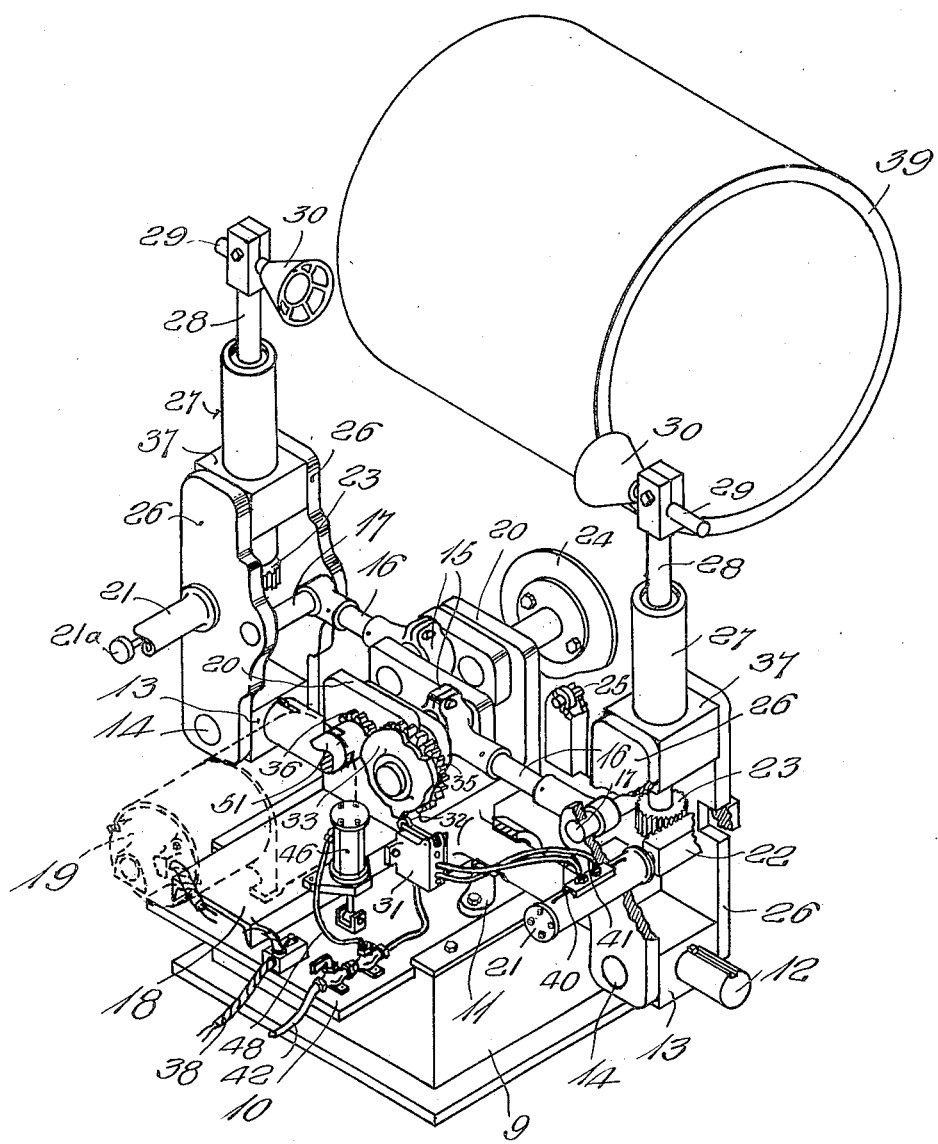
Figures 2, 3:
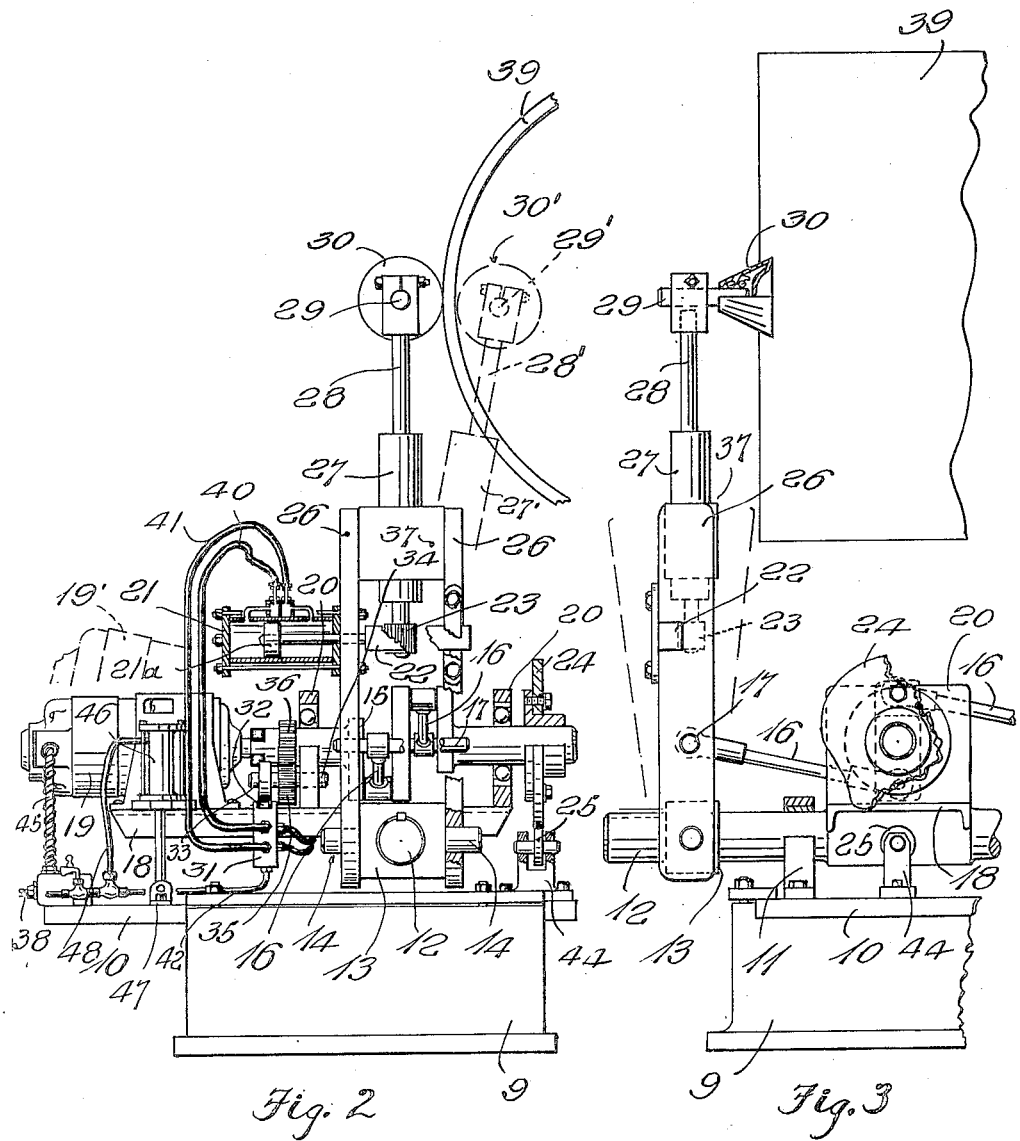

Other and further objects of my invention reside in the compact construction of a tire making machine as set forth more fully in the specification hereinafter following by reference to the accompanying drawings, in which:

Figure 1 is a perspective view of the improved tire making machine of my invention, with certain of the parts broken away and illustrated in section; Fig. 2 is an end elevational view of the tire making machine illustrated in Fig. 1, with certain of the parts broken away and illustrated in section, and certain of the parts broken away to illustrate more clearly the coaction of the parts located rearwardly of certain of the forwardly mounted parts; Fig. 3 is a fragmentary portion of the tire making machine illustrated in front elevation, with certain of the parts broken away and shown in section; Fig. 4 is a fragmentary view showing the relationship of one of the band rollers and the tire drum preparatory to a tire making operation; Figs. 5, 6, 7, 8, 9, 10 and 11 are sequence views showing the orbit of movement of the band roller in the course of operation of the band roller on the fabric of the tire during the tire carcass forming operation; and Fig. 12 is a fragmentary perspective view with certain of the parts shown in cross section for facilitating the explanation of the operation of the improved tire making machine of my invention.

In the tire making machine of my application 613,595, of August 30, 1945, now U. S. Patent No. 2,472,123, of which this application is a continuation in part, provision has been made for the construction of very heavy tire casings requiring a base and framework of special design. The improved tire making machine of my present invention has been developed for the rapid manufacture of tire casings of lighter weight particularly intended for passenger car service. My improved machine requires fewer and lighter built parts, and requires less power for its operation. The improved machine may be attached to some tire building machines now in use. The mechanical timing principles embodied in my improved machine are similar to those described more fully in my application 613,595.

A comparison of the cost of constructing the sliding roller mechanism of my application 613,595 with the cost of producing the pivoted roller mechanism of the present invention shows that my improved machine costs substantially less to build. Moreover, the parts of the improved machine may be more readily coordinated with equipment now in use on some tire making machines, such as air valves, foot control pedals, electric control switches, base and foundation structure, etc.

The machine of the instant invention is readily adapted for construction of tires of various sizes produced on a rotating tire drum. Adjustments are readily made in the machine of my invention to adapt the manipulators which I have developed for operation with tire drums of various diameters. I provide a sliding plate projecting from the back or motor end of the base, and on which provision is made for supporting a pair of rock shafts. The rock shafts provide means for mounting band rollers which are movable in an orbit with respect to opposite ends of the tire drum. Crankshafts with connecting rods are provided for controlling the movement of roller posts, which in turn control movement of the band rollers in an orbit with respect to the ends of the tire drum.

A program control mechanism is provided for governing the operation of the machine, including a pre-formed cam which operates in timed relation to the crankshafts and controls the operation of a compressed air cylinder, which in turn controls coacting mechanism for tilting the band rollers with respect to the tire drum in timed relation for manipulating the fabric with respect to the beads of the tire carcass in forming the tire casing.

The operation of the improved tire making machine will be more fully understood by detailed reference to the drawings, wherein reference character 10 designates a sliding base plate which is slidable with respect to a base structure shown at 9. The base structure does not need to be as massive as that provided in the machine of my application 613,595, supra. The sliding base plate 10 carries a pair of spaced rock shaft bearings 11, arranged transversely of the sliding base plate 10, and in these bearings a rock shaft 12 is journalled. The rock shaft 12 extends through pivot blocks 13 adjacent opposite ends of the shaft. These pivot blocks 13 have pivot block pins 14 extending transversely therefrom, and which enter the pairs of roller post yokes illustrated at 26. The pairs of roller post yokes 26 extend upwardly and are fastened to the blocks 37, from which the roller posts 27 extend in a vertical direction.

The base plate 10 provides a mounting means for the displaceable motor base 18, which carries motor 19 and crankshaft bearings 20. The crankshaft bearings 20 mount crankshafts 15, each of which have connecting rods 16 and connecting rod pins 17 associated therewith. The connecting rod pins 17 establish pivotal connection wtih the roller post yokes 26, as shown. The base 18 carries the geared motor 19, which is connected to the source of operating power through flexible cables 38 and 45, which permit motor base 18 and the sliding base plate 10 to be displaced with respect to base 9. Base 18 is pivotally supported with respect to sliding plate 10 by rock shaft 12 in rock shaft bearings 11, subject to angular displacement under control of tilting cam 24 carried by the end of the crankshaft system and the follower roller 25 mounted in bracket 44 on sliding base 10. For purposes of cushioning motor base 18 in its displacement and for compensating for any instability in the distribution of mass in the motor and crankshaft mechanism supported by base 18, I provide a dashpot 46 connected through rod 47 with sliding base plate 10 and supplied with air pressure through tube 48. Displacement of the crankshaft and motor base unit is thus cushioned against abrupt gravitation at the low points of the tilting cam 24. The position of the band rollers 30 mounted on roller spindles 29 supported by roller turning shafts 28 within roller posts 27 mounted in blocks 37 carried by roller post yokes 26, with respect to the rotatable tire drum represented at 39, is controlled by the air controlled cylinders 21 which apply air pressure to the pistons 21a therein connected through piston rods 22 with the pinion racks 22. The band rollers 30 are frustoconical in shape, with their wide bases presented to the surface of the rotatable tire drum 39, and are provided with antifriction bearings, enabling the band rollers to revolve with respect to the roller spindles 29.

Pinion racks 22 engage pinions 23 carried by the lower depending ends of the roller turning shafts 28. Pinions 23 are disposed intermediate the parallel extending roller post yokes 26, and in alignment with the pinion racks 22, enabling forward and rearward movement of pistons 21a in cylinders 21 to impart rotative movement to pinions 23 for revolving the roller turning shafts 28. The air controlled cylinders 21 are fastened to one of the side plates constituting the roller post yokes 26, and move with the roller post yokes 26. Accordingly, the air supply to air controlled cylinders 21 is carried thereto through flexible pipes 40 and 41, which extend to the distributing valve 31. The distributing valve 31, shown more particularly in Fig. 12, controls the supply of air pressure from flexible line 42, to either pressure supply line 40 or 41, by displacement of the spring controlled valve member 43 with respect to coacting ports in the valve housing leading to pressure distributing lines 40 and 41. Supply of pressure through pressure distributing lines 40 and 41 determines the direction of stroke of the piston rods associated with pistons 21a, and correspondingly the orientation of pinions 23, roller turning shafts 28 and the band rollers 30, for controlling manipulation of the fabric with respect to the rotatable tire drum 39. The position of spring controlled valve member 43 is controlled by the movement of the cam follower roller 32 which coacts with the program control cam 33 carried by timing shaft 34. Timing shaft 34 has a gear 35 thereon, which meshes with pinion 36 which is carried by one of the projecting ends of one of the crankshafts 15. In Fig. 12 the crankshafts 15 have been illustrated schematically connected through connecting rods 16 with the roller post yokes 26. The crankshafts 15 have associated therewith adjacent the rear of the machine the tilting cam 24, which serves to control the tilting of the crankshafts and motor base 18, which is displaceable as represented in Fig. 2, so that motor 19 assumes position 19′ while roller posts 27 move to position 27′; roller turning shafts 28 move to position 28′; roller spindles 29 move to position 29′ and band rollers 30 move to position 30′. To accomplish this, tilting cam 24 coacts with cam follower roller 25 journalled on the sliding base plate 18 in bracket 44. As heretofore noted, the motor base 18 is cushioned against abrupt gravitation by operation of dashpot 46 provided with sufficient bleeder control to insure rapid return of the band rollers 30 to required operative position impressing the fabric of the tire carcass into position with respect to the rotatable tire drum 39.

The sequence control for the movement of the band rollers 30 is effected by the pre-formed cam 33, which is shaped to provide a time sequence for the application for the plies of fabric to the tire drum, a turn down sequence for the band roller, a retraction of the band roller to starting position; a stitch down position of the band roller; a period for application of the bead to the fabric; and a turn up position for the band roller, and such repeating operations as are required to properly apply the fabric over the bead.

In Figs. 4–11 I have indicated the successive operations. For example, in Fig. 4 the band roller 30 is located externally to the rotatable tire drum 39 under control of air cylinder 21. In Fig. 5 the plies of fabric 49 have been applied to the rotatable tire drum 39 and band roller 30 is being advanced toward the end of the rotatable tire drum 39 by spreading movement of the crankshafts 15. In Fig. 6 a turn down movement has been imparted to band roller 30 by further displacement of pinion 22 and the plies of fabric have been moved inwardly at 49' over the end of the rotatable tire drum 39. The band roller 30 is then returned to the position illustrated in Fig. 7 at which time the bead 50 is applied over the inturned end of the fabric at 49''.

The next movement of the cam roller is a stitch down movement illustrated in Fig. 8 in which cam roller 30 is moved to a position substantially within the confines of the rotatable tire drum 39. The next sequence operation is depicted in Fig. 9 wherein cam roller 30 turns up to provide an an anvil against which the plies of fabric at 49''' are folded back upon the top of the fabric and over the bead 50. The next succeeding operation is depicted in Fig. 10 wherein the fabric at 49$^{iv}$ is pressed into surface engagement with the main body of the fabric 49 on the rotatable tire drum 39. Repeat operations may be effected as represented in Fig. 11 in applying additional layers of fabric over the fabric thus prepared, for strengthening the carcass and building the tire casing.

It will be understood that the orbit of movement of the band rollers is so controlled that multiple layers of fabric may be built up rapidly in forming the tire carcass at relatively low operating expense. The time sequence of operations may be readily adjusted and controlled by reshaping the cam 33, and throughout all of these operations the successive steps are all automatic.

In the operation of the improved tire making machine of my invention, the motor 19 drives the main shaft 51 to impart movement to the crankshafts 15 and through connecting rods 16 thereof to the roller post yokes 26. Roller post yokes 26 are thus shifted angularly with respect to each other in coplanar relation and with respect to the rotatable tire drum 39. In the course of this driving operation, two other movements are induced, that is, an angular movement of roller turning shafts 28 for shifting the band rollers 30 with respect to the surface of rotatable tire drum 39, and a tilting movement of crankshaft and motor base 18 by which band rollers 30 are displaced interiorly and exteriorly of the surface of the rotatable tire drum 39. These three movements coordinated by the program control cam 33 insure the building up of the tire carcass rapidly and automatically. The driving operation of motor 19 is continuous throughout all of the angular positions of the crankshaft and motor base 18, and is not interrupted by the tilting operation thereof. The fact that the sliding base 10 is adjustable in base 9 enables the entire mechanism to be adjusted with respect to the front of the rotatable tire drum 39 for initially aligning band rollers with the surface of the rotatable tire drum.

While I have described my invention in certain of its preferred embodiments, I realize that modifications and changes will readily occur to those skilled in the art from my disclosure herein, and I desire that it be understood that I intend no limitations upon my invention other than may be imposed by the scope of the appended claims.

What I claim as new and desire to secure by Letters Patent of the United States is as follows:

1. In a tire making machine a rotatable tire drum, a frame structure mounted adjacent said drum, a base plate slidably mounted with respect to said frame structure, a rock shaft mounted transversely of said frame structure, a base carried by said rock shaft above said frame structure and tiltable with respect thereto, a motor carried by said base, crankshaft journalling means supported by said base, a crankshaft system mounted in said crankshaft journalling means and driven by said motor, a tilting cam connected with said crankshaft system, a cam follower mounted on said frame in coplanar relation with said tilting cam whereby said base may be angularly shifted in position, vertically extending members pivotally mounted with respect to said rock shaft, connections between said crankshaft system and said vertically extending members, roller turning shafts journalled with respect to said vertically extending members, transversely extending roller spindles carried by said shafts, band rollers mounted on said spindles, said band rollers being displaceable linearly of said rotatable tire drum under control of said crankshaft system, and means carried by said vertically extending members for orienting said band rollers for compacting layers of fabric carried by said rotatable tire drum into a tire carcass.

2. In a tire making machine a rotatable tire drum, a frame structure mounted adjacent said drum, a base plate slidably mounted with respect to said frame structure, a rock shaft mounted transversely of said frame structure, a base carried by said rock shaft above said frame structure and tiltable with respect thereto, a motor carried by said base, crankshaft journalling means supported by said base, a crankshaft system mounted in said crankshaft journalling means and driven by said motor, a tilting cam connected with said crankshaft system, a cam follower mounted on said frame in coplanar relation with said tilting cam whereby said base may be angularly shifted in position, vertically extending members pivotally mounted with respect to said rock shaft, connections between said crankshaft system and said vertically extending members, roller turning shafts journalled with respect to said vertically extending members, transversely extending roller spindles carried by said shafts, band rollers mounted on said spindles, said band rollers being displaceable linearly of said rotatable tire drum under control of said crankshaft system, and compressed air operated means carried by said verticaly extending members and operated in timed sequence to the operation of said crankshaft system for orienting said band rollers and compacting multiple layers of fabric carried by said rotatable tire drum into a tire carcass.

3. A tire making machine comprising a rotatable tire drum, a frame structure mounted adjacent said drum, a plate slidable in said frame structure and adjustable toward or away from said rotatable tire drum, a rock shaft pivoted transversely of said plate, a base carried by said rock shaft, said base carrying a driving motor on one end thereof and a crankshaft system intermediate the ends thereof and driven by said motor, a tilting cam connected with said crankshaft system, a cam follower journalled on said plate in coplanar relation to said tilting cam for angularly displacing said base, a dashpot system controlling the movement of said base, vertically extending members pivotally mounted with respect to said rock shaft and projecting on oposite sides of said crankshaft system, roller turning shafts journalled with respect to said vertically extending members, roller spindles carried by said roller turning shafts, band rollers carried by said roller spindles, and means for orienting said band rollers with respect to the surface of the rotatable tire drum in timed relation to linear movement imparted to said band rollers under control of said crankshaft system, and in timed relation to the displacement of said band rollers interiorly and exteriorly of said rotatable tire drum for shaping layers of a fabric carried by the rotatable tire drum into a tire carcass.

4. A tire making machine comprising a rotatable tire drum, a frame structure mounted adjacent said drum, a plate slidable in said frame structure and adjustable toward or away from said rotatable tire drum, a rock shaft pivoted transversely of said plate, a base carried by said rock shaft, said base carrying a driving motor on one end thereof and a crankshaft system intermediate the ends thereof and driven by said motor, a tilting cam connected with said crankshaft system, a cam follower journalled on said plate in coplanar relation to said tilting cam for angularly displacing said base, a dashpot system controlling the movement of said base, vertically extending members pivotally mounted with respect to said rock shaft and projecting on opposite sides of said crankshaft system, roller turning shafts journalled with respect to said vertically extending members, roller spindles carried by said roller turning shafts, band rollers carried by said roller spindles, a sequence control mechanism driven by said motor, compressed air operated mechanism for orienting said band rollers, and means operated by said sequence control mechanism for rendering effective said compressed air operated mechanism in timed relation to the angular displacement of said base and the linear movement of said crankshaft system whereby said band rollers establish contacting relation with layers of fabric both inside and outside of said rotatable tire drum for shaping a tire carcass on said drum.

CONIOUS E. POWERS.

REFERENCES CITED

The following references are of record in the file of this patent:

UNITED STATES PATENTS

| Number | Name | Date |
|---|---|---|
| 2,161,117 | Wikle | June 6, 1939 |
| 2,394,464 | McChesney | Feb. 5, 1946 |
| 2,472,123 | Powers | June 7, 1949 |